US012760622B2

(12) United States Patent
Neu et al.

(10) Patent No.: US 12,760,622 B2
(45) Date of Patent: Oct. 13, 2026

(54) METHOD OF RETROFITTING A SERVICE RIG

(71) Applicant: Axis Energy Services, LLC, Dallas, TX (US)

(72) Inventors: Eric Neu, Lindsay, TX (US); Joe Ray Hall, Gainesville, TX (US); Ryan Earl Phillips, Midlothian, TX (US)

(73) Assignee: Axis Energy Services, LLC, Dallas, TX (US)

( * ) Notice: Subject to any disclaimer, the term of this patent is extended or adjusted under 35 U.S.C. 154(b) by 0 days.

(21) Appl. No.: 19/291,369

(22) Filed: Aug. 5, 2025

(65) Prior Publication Data

US 2026/0036021 A1 Feb. 5, 2026

Related U.S. Application Data

(60) Provisional application No. 63/810,272, filed on May 22, 2025, provisional application No. 63/746,556, filed on Jan. 17, 2025, provisional application No. 63/679,606, filed on Aug. 5, 2024.

(51) Int. Cl.

| | |
|---|---|
| ***E21B 41/00*** | (2006.01) |
| ***B62D 63/08*** | (2006.01) |
| ***E21B 15/00*** | (2006.01) |
| ***E21B 19/00*** | (2006.01) |
| *E21B 7/02* | (2006.01) |

(52) U.S. Cl.

CPC .............. *E21B 41/00* (2013.01); *B62D 63/08* (2013.01); *E21B 15/00* (2013.01); *E21B 19/008* (2013.01); *E21B 41/0021* (2013.01); *E21B 7/02* (2013.01)

(58) Field of Classification Search

CPC .................................. E21B 41/00; E21B 7/02

See application file for complete search history.

(56) References Cited

U.S. PATENT DOCUMENTS

| | | | | |
|---|---|---|---|---|
| 3,009,547 | A * | 11/1961 | Woolslayer | E21B 15/003 52/120 |
| 3,515,824 | A | 6/1970 | Woods et al. | |
| 3,759,489 | A | 9/1973 | Jones | |
| 3,906,369 | A | 9/1975 | Pitman et al. | |
| 5,292,108 | A | 3/1994 | Sutton | |
| 5,360,072 | A | 11/1994 | Lange | |

(Continued)

FOREIGN PATENT DOCUMENTS

| | | | |
|---|---|---|---|
| CA | 2700385 | C | 2/2015 |
| CN | 110761720 | A | 2/2020 |

(Continued)

*Primary Examiner* — Daniel P Stephenson

(74) *Attorney, Agent, or Firm* — Patterson + Sheridan, LLP

(57) ABSTRACT

A method of retrofitting a service rig includes obtaining a service rig having a powered service equipment for performing well service operations, an engine, and a transmission connected to and powering the powered service equipment. The method also includes disconnecting the engine and the transmission from the powered service equipment and removing the powered service equipment. The method further includes retrofitting the service rig with a plurality of electrically powered equipment for performing the well service operations, wherein the plurality of electrically powered equipment are operable while disconnected from the transmission.

25 Claims, 12 Drawing Sheets

(56) References Cited

U.S. PATENT DOCUMENTS

| | | | |
|---|---|---|---|
| 6,892,812 B2 | 5/2005 | Niedermayr et al. | |
| 7,185,881 B2 | 3/2007 | Drarvik et al. | |
| 7,518,526 B2 | 4/2009 | Newman | |
| 7,717,193 B2 | 5/2010 | Egilsson et al. | |
| 7,862,009 B2 | 1/2011 | Folk et al. | |
| 7,917,293 B2 | 3/2011 | Newman | |
| 8,215,417 B2 | 7/2012 | Annaiyappa et al. | |
| 8,232,892 B2 | 7/2012 | Overholt et al. | |
| 8,672,059 B2 | 3/2014 | Williams | |
| 8,820,719 B2 | 9/2014 | Ferrari | |
| 9,458,683 B2 | 10/2016 | Yorga et al. | |
| 9,919,903 B2 | 3/2018 | Patrick et al. | |
| 10,253,580 B2 | 4/2019 | Imbault | |
| 10,673,238 B2 | 6/2020 | Boone et al. | |
| 10,851,590 B2 | 12/2020 | Glover et al. | |
| 11,035,219 B2 | 6/2021 | Orban | |
| 11,339,612 B1 | 5/2022 | Newman | |
| 11,572,260 B1 | 2/2023 | Newman | |
| 11,773,652 B2 | 10/2023 | Piraccini et al. | |
| 11,879,332 B1 | 1/2024 | LaValley | |
| 2004/0162658 A1 | 8/2004 | Newman | |
| 2005/0253125 A1 | 11/2005 | Drarvik et al. | |
| 2006/0108113 A1* | 5/2006 | Scott | E21B 21/065 166/255.1 |
| 2008/0116432 A1 | 5/2008 | Folk et al. | |
| 2008/0203734 A1 | 8/2008 | Grimes et al. | |
| 2008/0283301 A1* | 11/2008 | Sherwood | E21B 21/066 175/66 |
| 2009/0084558 A1 | 4/2009 | Bloom | |
| 2009/0195074 A1 | 8/2009 | Buiel | |
| 2009/0200856 A1 | 8/2009 | Chehade et al. | |
| 2009/0312885 A1 | 12/2009 | Buiel | |
| 2011/0074165 A1 | 3/2011 | Grimes et al. | |
| 2011/0309315 A1 | 12/2011 | Williams | |
| 2012/0248078 A1* | 10/2012 | Zediker | E21B 7/14 219/121.67 |
| 2017/0314342 A1 | 11/2017 | Lesko | |
| 2018/0023354 A1* | 1/2018 | Dion | E21B 19/22 242/390.2 |
| 2019/0337392 A1* | 11/2019 | Joshi | H01M 10/44 |
| 2022/0090482 A1* | 3/2022 | Moberg | E21B 44/02 |
| 2022/0145730 A1* | 5/2022 | Benson | E21B 41/0085 |
| 2022/0329050 A1 | 10/2022 | Duncan | |
| 2022/0410994 A1* | 12/2022 | Arya | B60K 6/26 |
| 2023/0011867 A1* | 1/2023 | Arya | E21B 41/00 |
| 2023/0198295 A1* | 6/2023 | Wyman | E21B 41/00 166/65.1 |
| 2024/0200407 A1 | 6/2024 | Broussard et al. | |

FOREIGN PATENT DOCUMENTS

| | | | | |
|---|---|---|---|---|
| CN | 113073949 | B | 2/2023 | |
| CN | 109339702 | B | 10/2023 | |
| WO | 2011126661 | A2 | 10/2011 | |
| WO | WO-2024065058 | A1 * | 4/2024 | E21B 19/008 |

* cited by examiner

METHOD OF RETROFITTING A SERVICE RIG

CROSS-REFERENCE TO RELATED APPLICATIONS

This application claims the benefit of priority of U.S. Provisional Patent Application No. 63/810,272, filed on May 22, 2025; claims the benefit of priority of U.S. Provisional Patent Application No. 63/746,556, filed on Jan. 17, 2025; and claims the benefit of priority of U.S. Provisional Patent Application No. 63/679,606, filed on Aug. 5, 2024, each of the above applications is incorporated herein by reference in its entirety.

BACKGROUND

Field

Embodiments of the present disclosure generally relate to rigs, such as drilling or service rigs, and particularly to retrofitting a service rig.

Description of the Related Art

Service rigs have a self-contained transport system moving the service rig from one location to the other under its own power. The transporting system usually includes a diesel engine and a transmission connected to the diesel engine. The service rig also includes a steering system having one or more steering axles and wheels to maneuver the service rig to the right and left. A drivetrain transfers power from the diesel engine through the transmission to drive the wheels. In addition to transport, the diesel engine may also mechanically power the drawworks or other equipment on the service rig. In some instances, a separate diesel engine is used to power the drawworks and other equipment.

Diesel engines are known to be more fuel-efficient when compared to gasoline engines. However, diesel engines produce harmful emissions such as nitrogen oxides. Diesel engines require maintenance such as oil changes and filter changes. Diesel engines and other mechanically powered equipment on the service rig tend to be loud and dangerous with shafts and chains rotating at high speed.

There is a need, therefore, for a service rig having equipment that is safer, requires less maintenance, and/or operates more quietly. There is also a need for retrofitting a mechanically powered service rig to an electrically powered service rig.

SUMMARY

In some embodiments, a method of retrofitting a service rig includes obtaining a service rig having a plurality of mechanically powered equipment for performing well service operations. The method also includes retrofitting the service rig with a plurality of electrically powered equipment for performing well service operations.

In some embodiments, a method includes obtaining a service rig having mechanically powered equipment for performing well service operations, removing one or more of the mechanically powered equipment, and retrofitting the service rig with electrically powered equipment for performing well service operations. In some embodiments, one or more of the removed equipment is rebuilt, refurbished, tested, or certified, and then installed back onto the service rig. In some embodiments, the method includes obtaining electrically powered equipment and installing them onto the service rig to retrofit the service rig into an electrically powered service rig.

Embodiments of the present disclosure relate to a traditional service rig that has been retrofitted to a modernized condition using equipment such as electronics, electrical components, electrical safety systems, electric motors, sensors, electronic operation interface and other improvements in technology for operating the service rig while retaining several traditional service rig operational equipment. The present disclosure also relates to a modernized operator interface for controlling the operation of the rig. The interface controlling equipment such as electronic components, electric motors, electronic brake, and other retrofitted equipment. The present disclosure also relates to a computerized program that accepts commands from the operator in the form of pushed buttons or joystick movement, a programable logic controller (PLC) that provides a proper voltage, current or frequency necessary to complete the command by the operator. Examples of commands by the operator are raise, lower, or stop the traveling block. The rate of raising or lowering the traveling block can also be commanded by the operator. Raising or lowering force parameters including overpull safety can also be commanded by the operator using the electronic interface. Braking, stopping and holding are commands given by the operator using the interface system. The drawworks is powered by an electric motor operatively connected to the operator interface system where precise control over the torque of the motor by electrical inputs supplied by the PLC controls the movement direction, rate, braking, stopping and holding the traveling block.

In some embodiments, a method includes providing a mechanical service rig having a diesel engine, a transmission, and drawworks, The method includes removing the diesel engine, transmission, and drawworks. The method also includes installing an electric motor onto the frame of the service rig, installing a geared transmission functionally connected to the motor, and installing a drawworks drum functionally connected to the transmission. The method also includes providing a program for selectively controlling the electric motor torque to control the angular velocity and controlling location and velocity based on data received from a sensor system. In some examples, the method includes installing a tong system for making and breaking tubular connections. In some examples, the method also includes providing an electronic control system for controlling the electric functions of the rig such as sensors, a variable frequency drive, and electrical motors.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of the scope of the disclosure, as the disclosure may admit to other equally effective embodiments.

DETAILED DESCRIPTION

In some embodiments, the electrically powered service rig includes electrically powered equipment 225 that may be directly powered by electric motors, or the equipment may be indirectly powered by electric motors which power hydraulic pumps that power hydraulic motors and cylinders. The electrically powered equipment may include electronic circuitry and electronic controls.

Figure 1:
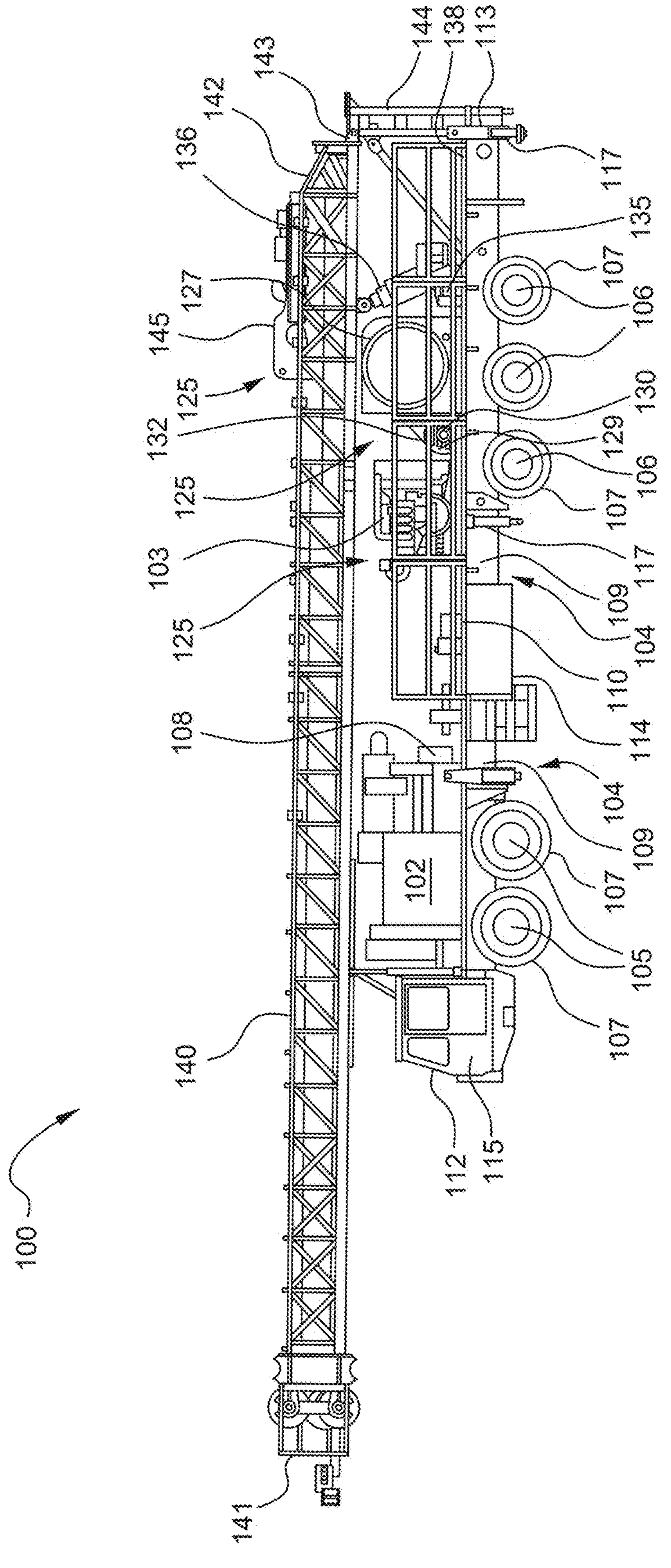
FIG. 1 illustrates a mechanically powered service rig with the derrick in the horizontal position and with two engines.
Figure 2:
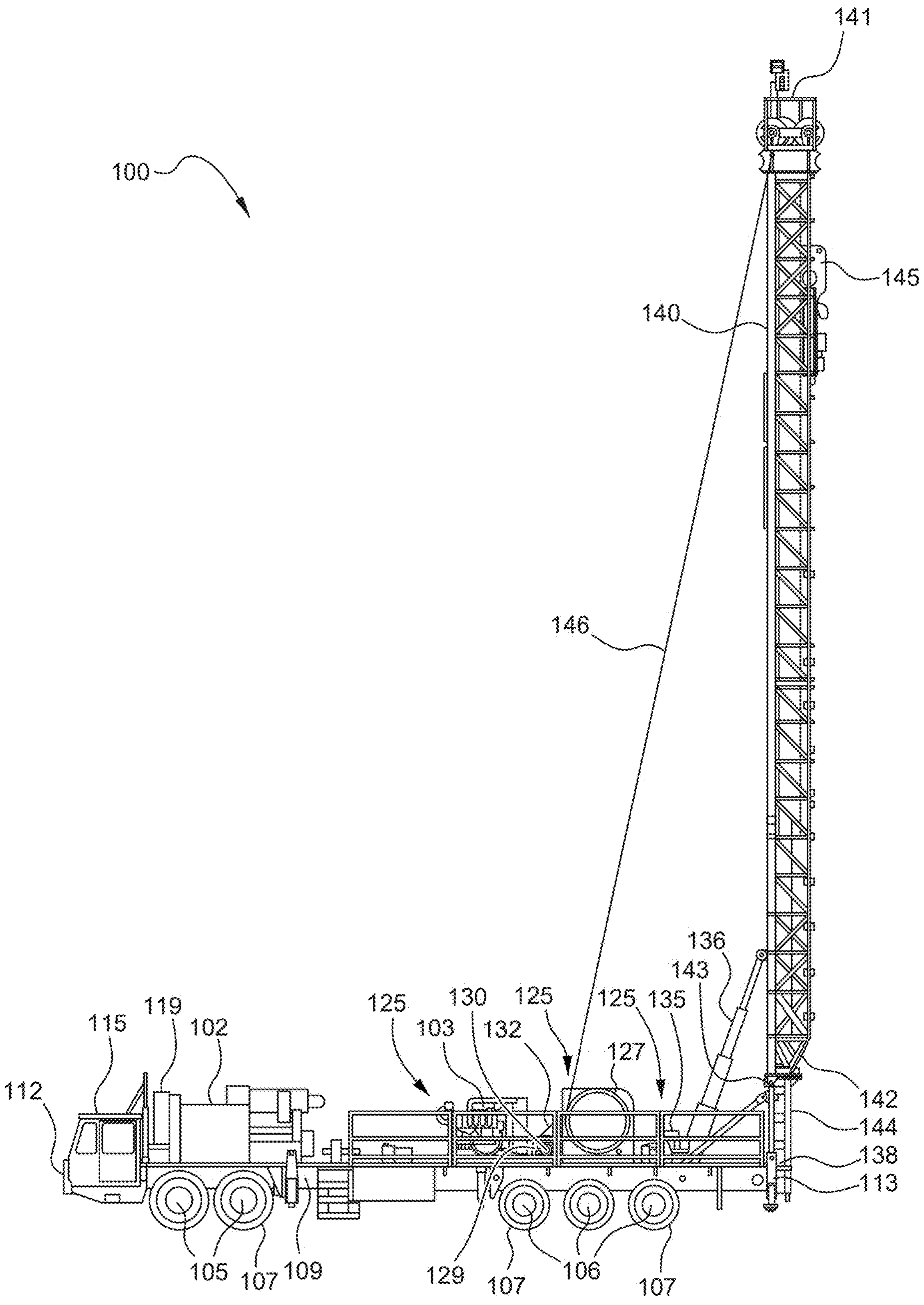
FIG. 2 illustrates the mechanically powered service rig of FIG. 1 with the derrick in the vertical position.
Figure 3:
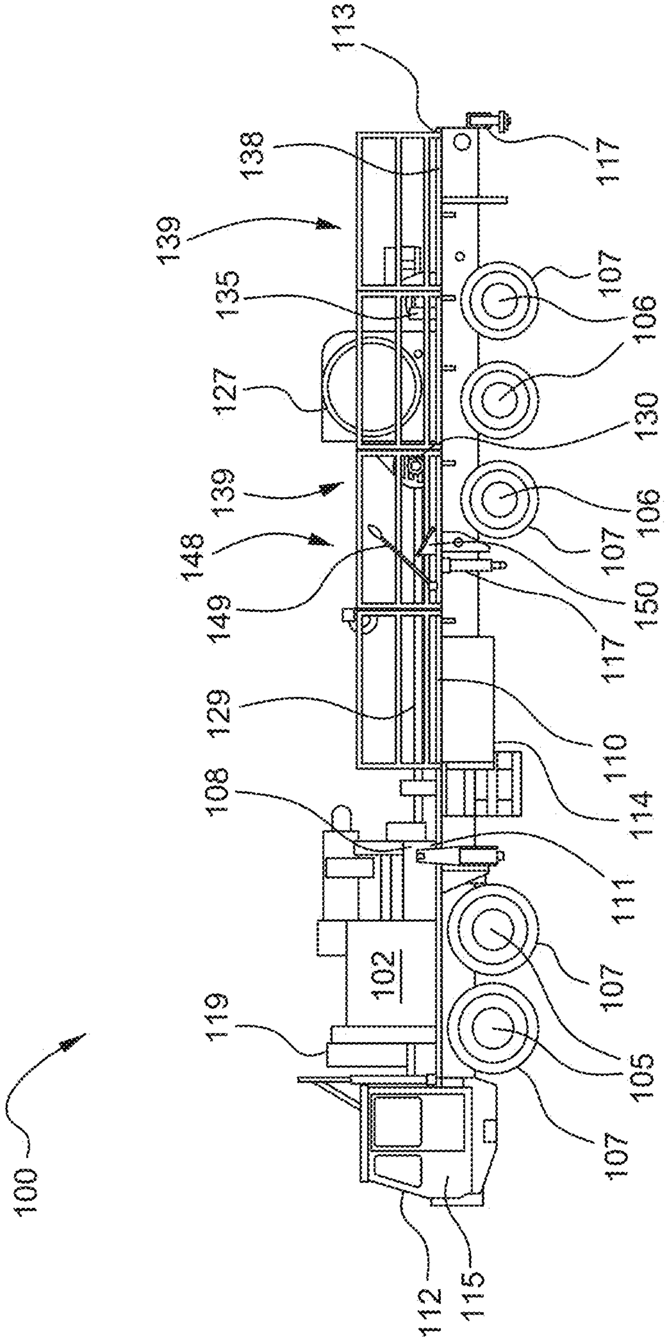
FIG. 3 illustrates a mechanically powered service rig having only one engine and with the derrick and derrick base removed, according to some embodiments.

FIGS. 1, 2, and 3 illustrate embodiments of a service rig 100 having mechanically powered equipment 125. The mechanically powered equipment 125 can be directly or indirectly powered by at least one internal combustion engine, such as by a first engine 102 and a second engine 103 on the service rig 100. The mechanically powered service rig 100, usually a used service rig, would include a chassis 104 supported by a suspension system (not shown) which includes springs, at least one steering axle 105, a plurality of rear supporting and drive axles 106, a plurality of wheels 107, and a braking system (not shown). The service rig 100 includes a front end 112 and a rear end 113. The chassis 104 includes a structural steel framework, which may include a plurality of I-beams 109 and a deck plating 110, which is horizontally attached to the top of the framework for personnel walking and mounting of the mechanically powered equipment 125.

In the embodiment shown in FIG. 3, the internal combustion engine on the mechanically powered service rig 100 includes only a single engine, such as the first engine 102, used for transportation of the service rig 100 and for powering the mechanically powered equipment 125. In some examples, the first engine 102 is a diesel engine. A transmission 108 includes a switchbox portion 111 that operatively and rotationally connects the first engine 102 to a drivetrain (not shown) for powering the mechanically powered service rig 100 as it travels from location to location. The service rig 100 also includes controls for steering and driving by an operator in a cab 115 located near the front end 112 of the service rig. The service rig 100 also includes equipment associated with a motorized vehicle. The associated equipment include a brake system and its hydraulic system and an electrical system for powering lights or small electrical motors, such as window whippers and a fuel tank 114. The first engine 102 also includes associated equipment such as a cooling system 119, at least one battery and charging alternator for starting and operating electronics, or any other equipment known to be associated with an internal combustion engine.

FIGS. 1 and 2 illustrate an embodiment of the service rig 100 including a first engine 102 and a second engine 103, which may be diesel engines. In some embodiments, the second engine 103 is used solely for powering the mechanically powered equipment 125, and the first engine 102 is solely used for transport power. In this embodiment, since the first engine 102 is solely used for powering the drivetrain during transport of the service rig, the transmission 108 is not required to include a switchbox portion 111.

The mechanically powered service rig 100 also includes service equipment used in performing rig service operations at a wellsite. The service equipment is powered by and operatively connected to the first engine 102 or the second engine 103. The service equipment may be mechanically powered equipment 125 such as a mechanically powered drawworks 127 or a mechanically powered sandline winch. In the embodiment having only a first engine 102, the switchbox portion 111 of the transmission 108 can be selectively disengaged from the drivetrain and then engaged to the mechanically powered equipment 125. In the embodiment having only a first engine 102, rotational motion from the first engine 102 is transferred to a shaft 129. In the embodiment having both the first engine 102 and the second engine 103, rotational motion from the second engine 103 is transferred to the shaft 129. The shaft 129 has a rotational axis running from the front end 112 of the service rig to the rear end 113 of the service rig. The shaft 129 is usually operatively connected to a miter gear system 130 which changes the rotational axis direction 90 degrees from front to rear to side to side. The miter gear system 130 is then operatively connected to a drawworks gearbox system 132 with chains and sprockets for rotating a drum of the drawworks. The first engine 102 may power a hydraulic pump 134 operatively connected through other shafts and gears (not shown) to run at least one winch 135 with hydraulic motors, at least one hydraulic cylinder 136, or at least one tong (not shown).

A rig floor 138 where wellsite service operations are performed is located at the rear end 113 of the service rig 100. The service rig 100 also includes a derrick 140 having a crown block 141 with sheaves, a derrick bottom 142 located above the rig floor 138, a traveling block 145, and a hook or elevator operatively connected to the mechanically powered drawworks 127 by a cable 146. The cable 146 winds and unwinds around the drum of the mechanically powered drawworks 127. The derrick 140 is usually pivotably connected to a derrick base 144 such that the derrick 140 can be placed in a relatively horizontal position for transportation as shown in FIG. 1 or placed in a relatively vertical position during well service activities, as shown in FIG. 2.

The mechanically powered drawworks 127 is operated by mechanical controls 148 as shown in FIG. 3 that may include a clutch and a mechanical braking system for the drum. The mechanical braking system can be a band brake or other mechanically actuated braking system for controlling the speed of or stopping the drum from turning. The mechanical controls 148 for the mechanically powered drawworks 127 may be a lever 149 and at least one foot petal 150 controlled by an operator, as shown in FIG. 3.

The derrick 140 of the service rig 100 is pivotably connected to the derrick base 144. The derrick base 144 is connected to the chassis 104 towards the rear end 113 of the rig and above the rig floor 138. The derrick 140 may be raised or lowered between horizontal and vertical positions as shown in FIGS. 1 and 2 using the at least one hydraulic cylinder 136. In some examples, the derrick 140 may be raised or lowered using the cable system of the mechanically powered drawworks 127, or a separate cable winch system powered by the first engine 102 or the second engine 103 and the hydraulic pump.

It is contemplated the service rig may include other associated equipment for performing rig up operation or well service operations that derive power and operation from the first engine or the second engine.

Figure 4:
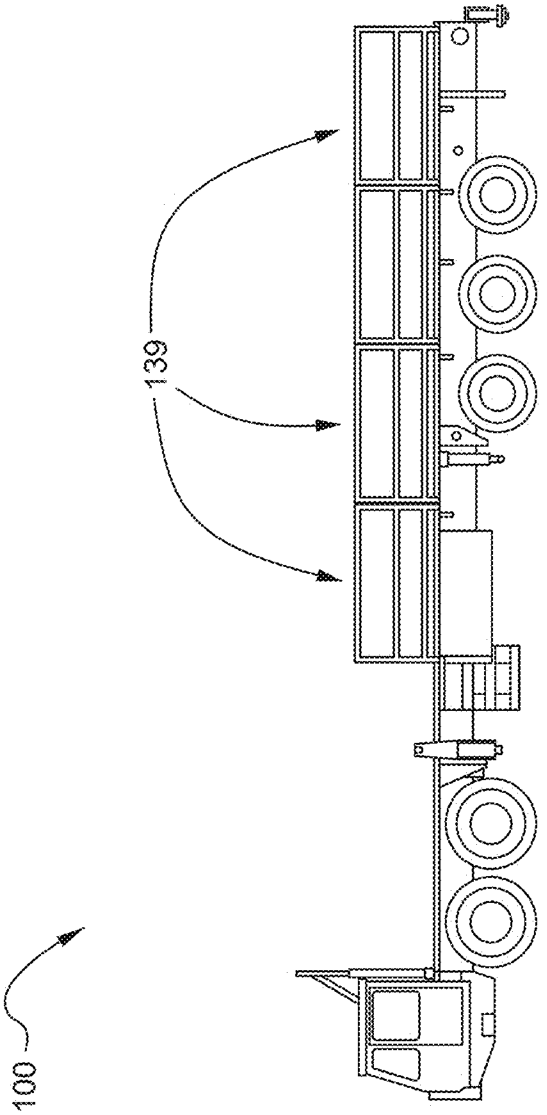
FIG. 4 illustrates the mechanically powered service rig of FIG. 3 with the engine, the drawworks and mechanical mechanisms removed, according to some embodiments.

In some embodiments, a method of retrofitting a service rig includes disconnecting and removing one or more mechanically powered equipment 125 used in performing the well service work at the wellsite powered by the first engine 102 or second engine 103. In some examples, the mechanically powered service rig 100 is moved into a work area, such as a large building equipped with a lifting crane. If the service rig only has the first engine 102, the first engine 102 along with the transmission 108 and switchbox portion 111 is disconnected and removed from the service rig 100. The first engine 102 and transmission 108 are rebuilt according to manufacturer's specifications for use on the retrofitted electrically powered service rig 200. If the service rig 100 includes the first engine 102 and the second engine 103, the first engine 102, the transmission 108, and the second engine 103 are disconnected and removed. FIG. 4 shows the service rig 100 with the first engine 102 and, if any, the second engine 103 removed. The disclosure includes following governmental regulations and industry standards for disposal of any hazardous fluids associated with the engines and transmission.

As shown in FIG. 3, the method includes disconnecting and removing the derrick 140, the derrick base 144, and associated equipment from the service rig 100. Before removing the derrick 140 from the derrick base 144, one or more of the cables 146, the pulleys, the traveling block 145, and a plurality of stabilizing guy wires are disconnected and removed from the service rig 100. The equipment, such as the hydraulic cylinders 136 or the winch system, that rotate the derrick between horizontal and vertical positions are disconnected and removed from the derrick 140 and chassis 104 before the removal of the derrick 140 and the derrick base 144. The derrick 140 is disconnected and removed from the derrick base 144 by removing a plurality of pins pivotably attaching the derrick 140 to the derrick base 144. The plurality of pins are at a pivoting connection 143 located towards the derrick bottom 142 and a top end of the derrick base 144, as shown in FIGS. 1 and 2. The derrick base 144 is usually fastened to the chassis 104 towards the rear end 113 of the service 100 rig using bolts or another fastening system. The derrick base 144 is then disconnected and removed from the service rig 100. Other equipment associated with the derrick 140 and derrick base 144 are disconnected and removed from the service rig 100. Examples of removed equipment include small electrical wiring and lighting. In some embodiments, inspection, repair if needed, and re-qualifying the derrick 140 and derrick base 144 according to API (e.g., API RP 4G, API RP 7L, API RP 8B) or other standards for indications of strain, stress cracking, and fatigue with non-destructive testing such as a CAT IV by a third party. After testing and re-certification for use, the derrick 140 and derrick base 144 are painted and made ready for re-installation onto the electrically powered service rig 200, as described in detail below.

In some embodiments, the method includes disconnecting and removing the mechanically powered drawworks 127 including the gearbox 132. The gearbox 132 is attached to the top of the chassis 104, usually on the deck plating 110 using fasteners such as bolts. In some examples, the mechanically powered drawworks 127 are not used to retrofit the service rig 200. Instead, the drawworks 127 can be sold or scrapped. One or more other equipment associated with the mechanically powered drawworks 127 are disconnected and removed. For example, the mechanical controls 148 including hydraulic valve blocks, hydraulic lines, shut down buttons, the levers 149 and petal 150 are removed.

In some embodiments, the method also includes disconnecting and removing hydraulic equipment, including hydraulic controls for operating hydraulic equipment such as winches 135 and a plurality of leveling and stabilizing jacks 117, as shown in FIGS. 1, 2, and 3. The removal includes disconnecting and removing the hydraulic pump powered by the first engine 102 or second engine 103. In some embodiments, the method includes leaving the leveling and stabilizing jacks 117 attached to the chassis 104. In some examples, the leveling and stabilizing jacks 117 are detached and later reattached at another location on the chassis 104 as part of the retrofitting process. The hydraulically powered equipment, such as the winch 135 with hydraulic motors, are disconnected and removed from the service rig 100 along with any associated equipment, such as hydraulic manifolds, controls, hydraulic lines, hydraulic fluid tanks. In some embodiments, any associated equipment for the hydraulic system are all disconnected and removed.

The method of retrofitting may also include disconnecting and removing a system of collapsible walkways 139 with handrails from the service rig chassis 104. The system of walkways 139 with handrails may be repaired, prepared, and/or painted and later re-installed as part of the retrofitting process. In some examples, the walkway system 139 may remain on the service rig and painted at the same time as the remaining service rig is painted, as described below and shown in FIGS. 4 and 5.

In some embodiments, the method also includes disconnecting and removing any old electrical wiring used for vehicle operation or well service operation, such as alarms, switches and lighting. The plurality of leveling and stabilizing jacks 117 attached to the service rig chassis 104 may be disconnected and removed, and re-installed later at a more strategic location on the chassis, or the jacks 117 may be serviced without removal.

When the mechanically powered service rig 100 with only the first engine 102 or both the first and second engines 102,103, transmission, the derrick 140 and the derrick base 144 and associated components, and all mechanically powered equipment 125 and associated components, and all the hydraulics, and all the wiring and any other equipment described above are disconnected and removed, the remaining chassis 104, the deck plating 110, driver cab 115 and any other remaining equipment are prepared and painted to make ready for the retrofitting installation of the electrically powered service equipment 225 including electronic devices, re-certified derrick 140 and derrick base 144 and any other equipment described below.

Figure 5:
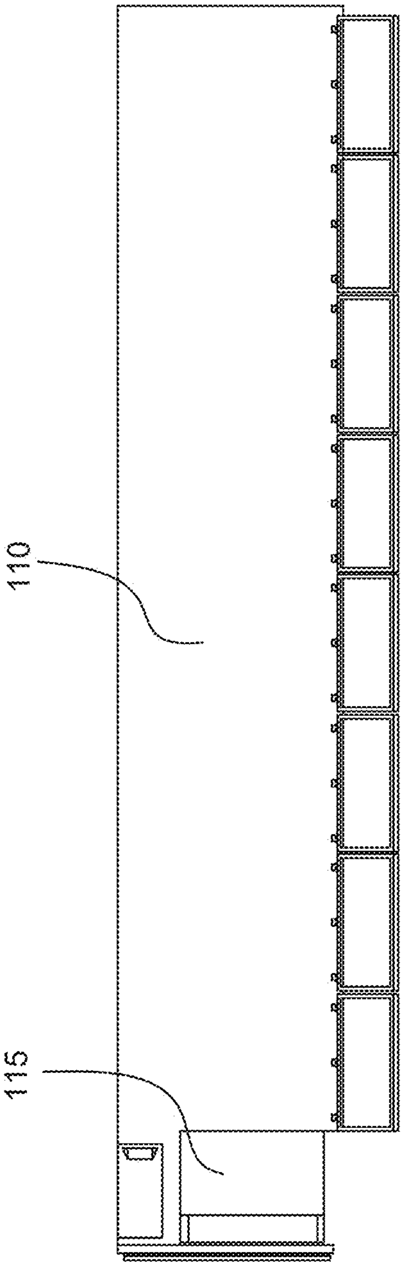
FIG. 5 illustrates a top view of the remaining chassis, cab, and walkway system of the mechanically powered service rig of FIGS. 3 and 4 that have been painted, according to some embodiments.
Figure 6:
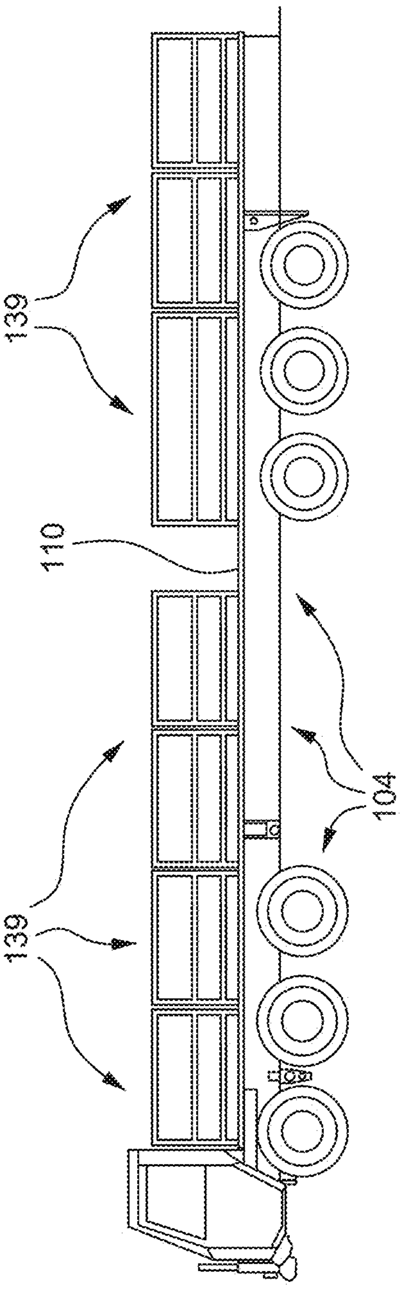
FIG. 6 illustrates a side view of the mechanically powered service rig of FIG. 5, according to some embodiments.
Figure 7:
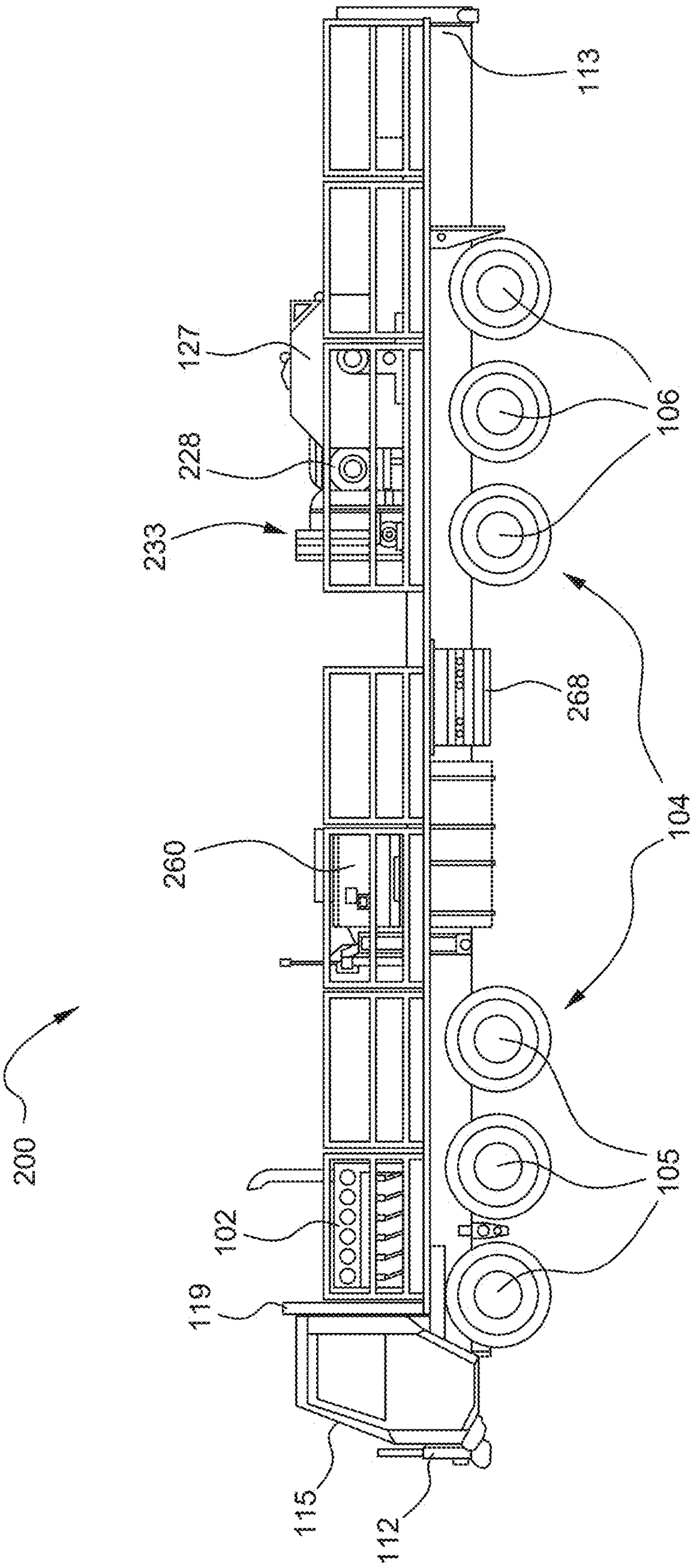
FIG. 7 illustrates the painted chassis, cab, and walkway system of FIGS. 5 and 6 at the start of the installation process with the rebuilt engine and transmission, HPU system, electrically powered drawworks, electric drawworks motor, and the blower cooling system to make it into an electrically powered service rig, according to some embodiments.
Figure 8:
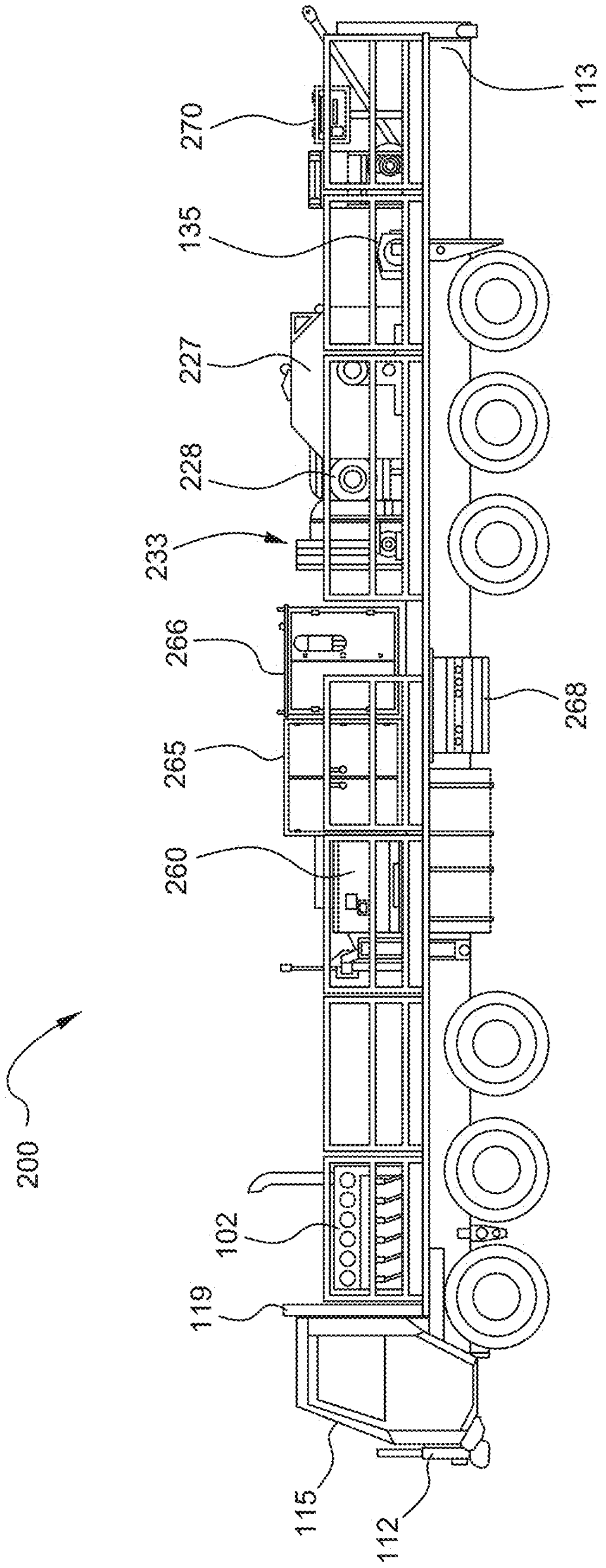
FIG. 8 illustrates the electrically powered service rig of FIG. 7 with the air compressor, I/O box, connection center, and control center installed, according to some embodiments.
Figure 9:
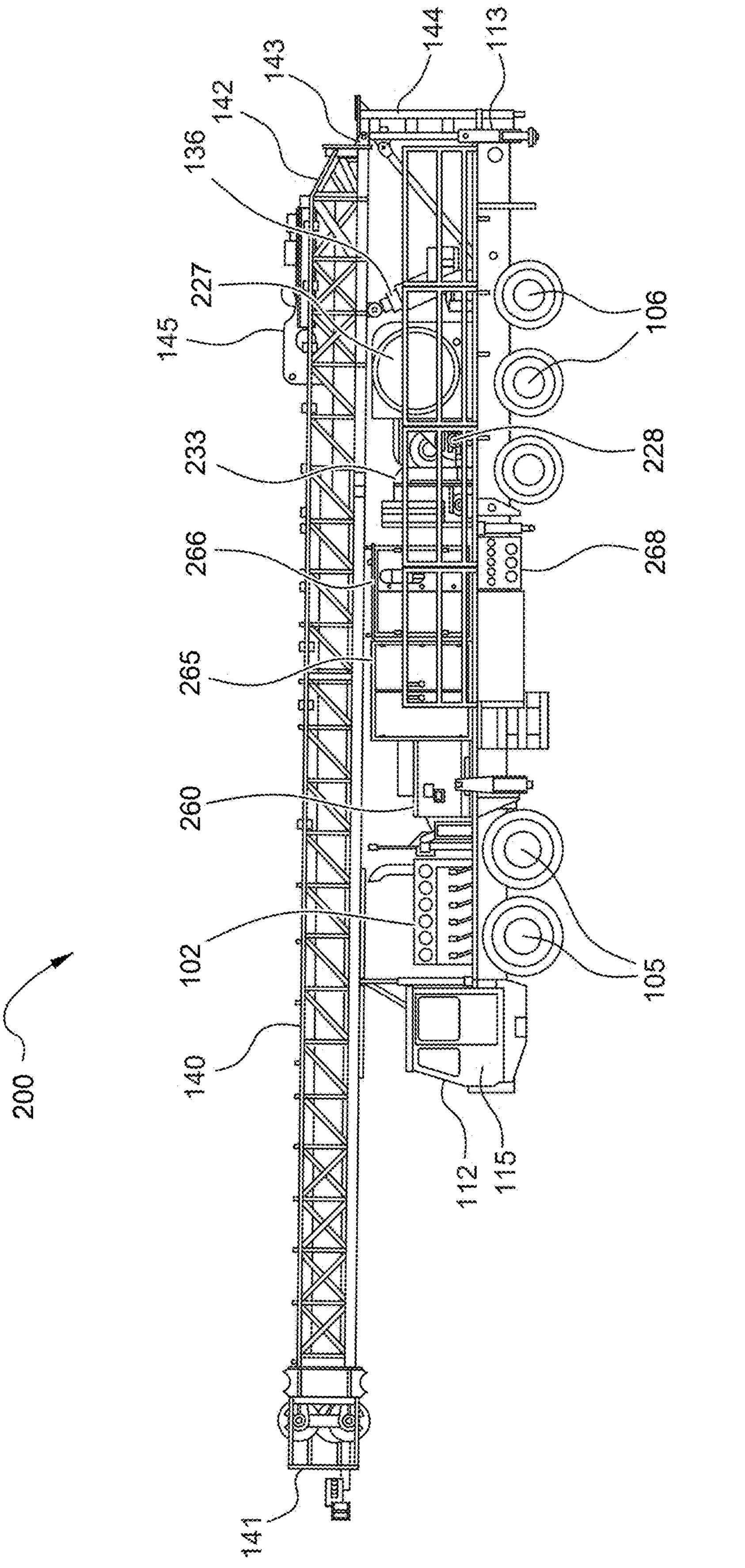
FIG. 9 illustrates the electrically powered service rig of FIGS. 7 and 8 with the derrick base, derrick and associated equipment, axles, and equipment installed, according to some embodiments.

Embodiments of the present disclosure include a method of retrofitting a mechanically powered service rig 100, as shown in FIGS. 1 to 6, into an electrically powered service rig 200, as shown in FIGS. 7 to 9. In some examples, the method includes painting one or more of the chassis 104, the deck plating 110, driver cab 115, and the walkway system 139 with handrails, as shown in FIGS. 5 and 6. In some examples, the method includes installing equipment that are electrically powered, either directly or indirectly, onto the former mechanically powered service rig. In some examples, the electrically powered equipment include electronic devices, electrical motors, and electronic circuitry. In some examples, the method also includes installing fastening structures and hardware, such as mounting brackets or platforms, to the chassis of the retrofitted service rig to accommodate the electronically powered equipment, including electrical devices, electrical motors, electronics and associated cabinetry. In some examples, the method also includes installing fastening structures and hardware to the chassis of the retrofitted service rig to accommodate installation that were disconnected and removed from the former mechanically powered service rig. Examples of the selective equipment include the hydraulic pump, hydraulically powered winches, and tanks. In some examples, the method also includes installation of the rebuilt engine, transmission, tested and re-certified derrick base 144 and derrick 140, and other equipment required to construct an electrically powered service rig, described in detail below. It is contemplated that electrically powered equipment used to retrofit the service rig may be obtained as new, used, or rebuilt equipment.

In some embodiments, the newly painted chassis 104, the painted deck plating 110, painted cab 115, the painted walkway system with handrails 139 shown in FIGS. 5 and 6 are usually placed inside of a large shop having an overhead crane and sufficient floor space to accommodate a forklift. The crane and forklift can lift and maneuver heavy equipment to be installed onto the retrofitted service rig 200.

If calculations of weight and strength require the inclusion of additional axles, at least one rear supporting or drive axle 106 may be installed towards the rear end 113 of the chassis 104 and/or at least one steering axle 105 may be added towards the front end 112 of the chassis 104 as shown in FIG. 9. The additional axles are strategically positioned according to calculations but may be repositioned later after pull testing of the retrofitted service rig 200. In some examples, any of the axles 105,106 may be repositioned along the chassis 104 according to strength or weight distribution calculations. One or more of the additional axles may have a suspension system and may contain brakes, usually hydraulic brakes. If the additional axle is a drive axle, the additional axle will be part of the drivetrain.

The retrofitted electrically powered service rig 200 may use a single engine for transporting. In this respect, the first engine 102 and transmission 108 that were rebuilt are installed onto the chassis 104 with engine mounts, as shown in FIG. 7. The cooling system, as part of the associated engine equipment, is installed and operatively reconnected to the rebuilt engine. The transmission 108 is also connected to the drivetrain. Driver controls that operate the rebuilt first engine 102 would be connected to the first engine 102. The driver controls include an accelerator, ignition, and other associated equipment for the operator to control the engine. In some examples, a suitable engine from another carrier rig may be used, or a completely new engine or transmission may be used as part of the engine of the service rig 200.

One or more steering mechanisms disconnected and removed from the service rig 100 are provided and reconnected such that an operator can steer the retrofitted service rig 200 during transport. New hydraulic lines to operate the brakes are installed onto the retrofitted service rig 200 and connected to all axles having brakes. New electrical wiring may be installed for lights and equipment needed to drive the service rig 200.

In some embodiments, the retrofitting method includes installing a hydraulic pumping unit (HPU) system 260 used to provide pressurized hydraulic fluid to hydraulic equipment on the electrically powered service rig 200, as shown in FIG. 7. The HPU 260 is strategically positioned according to strength and weight distribution calculations and ergonomics. The HPU system 260 includes an HPU electric motor which is rotationally and operatively connected to an HPU hydraulic pump. The HPU system 260 also includes a reservoir tank to supply hydraulic fluid to the pump. The HPU system 260 may also include sensors, a filtering system, a plurality of hydraulic line connections, electronic switches, and other equipment to enable the HPU system 260 to provide pressurized hydraulic fluid for the retrofitted service rig. The HPU electric motor and HPU pump may be directly connected, mounted and fastened on a platform structure fastened to the chassis 104 and deck plating 110 or fastened directly onto the decking using brackets, as shown in FIGS. 7 and 8. The HPU electric motor and HPU pump may be enclosed in an HPU housing. The HPU electric motor and the HPU pump may be separated and indirectly connected by a shaft. Hydraulic lines may be obtained and installed onto the chassis 104 and routed from the hydraulic line connections of the HPU 260 to various locations on the service rig 200 to run hydraulically powered winch motors, hydraulic jacks and stabilizing equipment, hydraulic cylinders or other hydraulically powered equipment. The hydraulic lines may be run from a valve block at a control center described in detail below.

In some embodiments, the retrofitting method includes installing an electrically powered drawworks 227 with a drum. The electrically powered drawworks 227 can be strategically positioned onto the chassis according to weight and strength calculations and ergonomics, as shown in FIGS. 7 and 8. The electrically powered drawworks 227 may be new or used. The electrically powered drawworks 227 can be positioned for maximum lifting advantage when performing wellsite service work. The electrically powered drawworks 227 include a gearbox with gearing and a gear box connection shaft. The gearbox enables rotational and operative connection between the drum of the electrically powered drawworks 227 and an electric drawworks motor 228, as shown in FIGS. 7 and 8. The electric drawworks motor 228 is obtained and installed onto the retrofitted electrically powered service rig 200 and operatively and rotationally connected to the gearbox connection shaft for powering and controlling the rotation of the drum of the drawworks 227. The electric drawworks motor 228 may be a dynamic motor having rotational control by an operator. The rotational dynamics of the drawworks drum for lifting and lowering the traveling block and for braking and stopping the drum can be controlled by input commands from an operator, as described below. In some examples, high-power inputs are required for rotational control, and the electric drawworks motor 228 will heat up to an unacceptable level. Sensors on the drum and electric drawworks motor 228 provide data for the rotational control. A blower cooling system 233 with forced air and powered by a blower electric motor is installed on or near the electric drawworks motor 228 for temperature control of the electric drawworks motor 228.

As shown in FIG. 8, the retrofitted service rig 200 includes an electrical control box (I/O Box) 265 containing electrical connections, electrical equipment (such as relays, PLCs, power supplies, phase controllers, etc.) that electronically connect the electric drawworks motor 228 and other electrical or electronic equipment to the control center. The I/O Box 265 is installed and fastened onto the chassis 104 and decking 110 of the retrofitted service rig 200 via brackets or mounted and fastened to a platform structure that is fastened to the chassis 104 and decking 110. The I/O Box 265 is strategically positioned for weight distribution, ergonomics, and functional control.

In some embodiments, the retrofitting method includes installing a second hydraulic pumping unit (HPU) system, which may be used to provide pressurized hydraulic fluid to actuate a second braking system for the drawworks drum. The second HPU system includes a second HPU electric motor, and second HPU hydraulic pump, sensors, electric switches and relays, hydraulic line connections, or other equipment and may be dedicated solely to the second braking system. The second HPU system is strategically positioned on the retrofitted rig according to weight and strength calculations and ergonomics. It is mounted and fastened to a platform structure that is fastened to the chassis 104 and decking 110 or mounted and fastened directly onto the chassis and decking. The second braking system for the drawworks can be used for backup braking, long term braking, or emergency safety braking and is activated in programed function with the electronic braking of the electric drawworks motor 228 as described below.

In some embodiments, the retrofitting method includes installing a control center 270 onto the retrofitted electrically powered service rig 200, as shown in FIG. 8. The control center 270 is used by an operator to input selective commands to operate the electric drawworks motor 228. The control center 270 may be on a framework and enclosed in a housing, strategically positioned for ergonomics and for the operator to have full view of the derrick and traveling block as well as the rig floor. The control center 270 also has controls for operating hydraulically powered winches 135 that receive pressurized hydraulic fluid from the HPU. The controls for operating the hydraulically powered winches may be a valve bank controlled by solenoids. The control center may also include controls for operating the slips during service operations.

In some embodiments, an air compressor 266 is installed on the retrofitted rig 200. The air compressor 266 is powered by an air compressor electric motor. The air compressor 266 is strategically positioned and fastened to the chassis and decking or is indirectly fastened to the chassis on top of a platform structure. The air compressor 266 is used to power pneumatically powered equipment, such as slips, or to power hand tools. In some examples, the air compressor 266 includes an air tank, pneumatic connections, sensors, electrical connections or any other equipment required for its operation. The air compressor 266 may pressurize the control panel for explosion proof requirements, such as Class 1 Division 2. Pneumatic lines are installed on the retrofitted service rig 200 and routed between the air compressor's pneumatic connections and the pneumatically powered equipment. Electric power lines and communication lines are installed onto the retrofitted service rig 200 to operate and control the air compressor 266.

As shown in FIGS. 8 and 9, the retrofitting method includes installing an electrical power line and communication line connection center 268 on the chassis 104 of the retrofitted electrically powered service rig 200. The line connection center 268 is strategically positioned, such as placed on the side of the chassis between the front end and the rear end. The line connection center 268 receives lines coming from another location, which may be one or more support vehicles or trailers containing electrical equipment used for operation of the retrofitted electrically powered rig 200. Electrical power lines may be supplied from an onsite electrical generator or from a utility grid and are connected to the line connection center 268.

Figure 10:
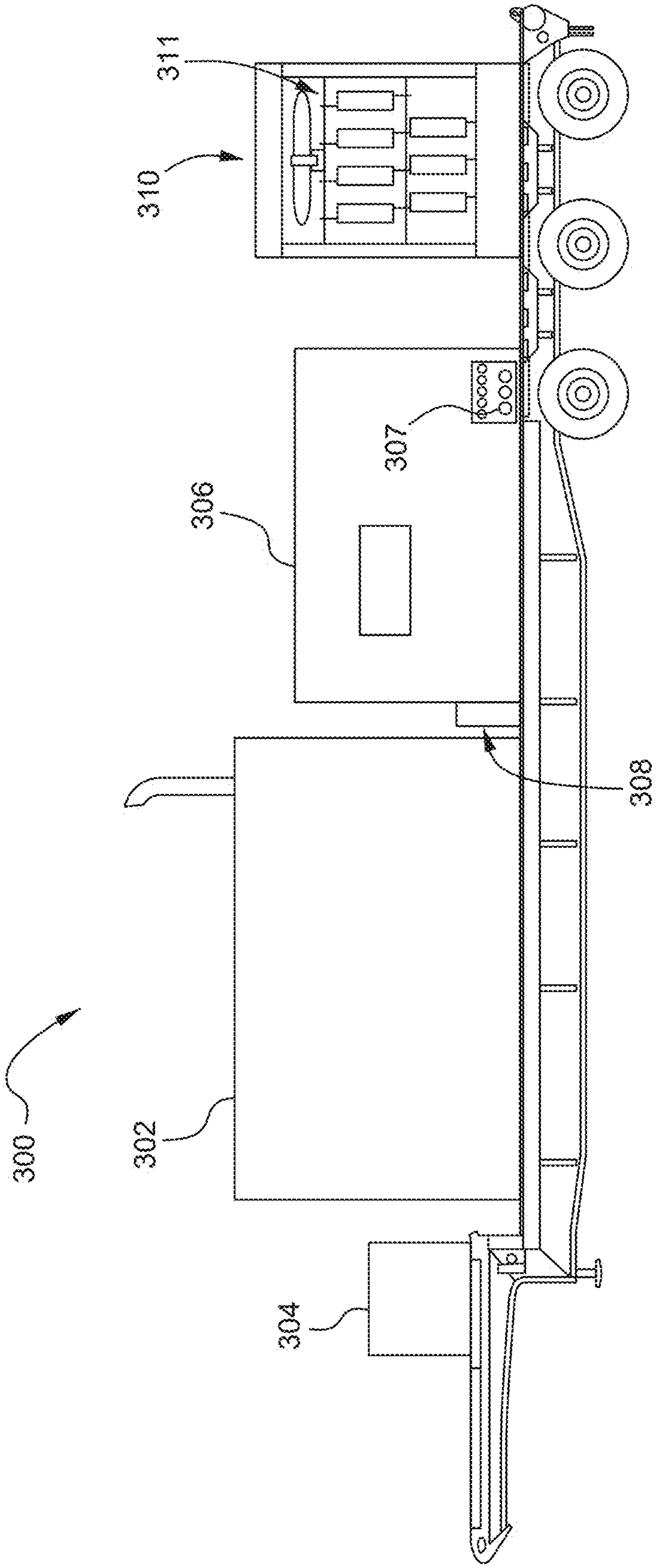
FIG. 10 is a side view of a support system, according to some embodiments.

In some embodiments, the retrofitting method includes supplying a separate support system 300 to support the retrofitted electrically powered service rig 200, as shown in FIG. 10. The support system 300 may be a vehicle, trailer, or skid containing electrical equipment that may be too large or heavy to be installed onto the chassis 104 of the electrically powered service rig 200. In some examples, the support system 300 includes an electric generator 302 to supply electrical power to the electric motors, which may include the electric drawworks motor 228, the air compressor 266, and the electric motor of the HPU 260. The generator 302 may also supply power to the control center 270, any lighting and electric sensors, and the various electrical equipment. The support system 300 may include a fuel tank 304 for the generator 302. The separate support system 300 may include a variable frequency house (VFD house) 306 which has a VFD (Variable Frequency Drive) for controlling the electric drawworks motor 228, a plurality of programable logic controllers (PLCs), a plurality of electrical connections 307, a cooling system such as an air conditioning system to cool the electronics, and other supporting equipment. The plurality of electrical connections 307 includes electric power connections and communication connections that enable installation of electric power lines and electrical communications lines between the separate support system 300 and the electrical power line and communication line connection center 268 on the chassis 104 of the retrofitted electrically powered service rig 200. Also shown in FIG. 10, the VFD house 306 includes a connection panel 308 for connecting to a power grid so the generator 302 could be shut down and kept for backup power. In some embodiments, the electrical communication connections allow communication between the PLCs and various electrical equipment.

As shown in FIG. 10, the separate support system 300 further includes an electrical resistor system 310 for dissipating electrical energy generated during the electrical braking of the electrical drawworks motor 228. The electrical resistor system 310 includes a cooling system 311, such as a forced air blower, for convectively removing the heat generated by the resistors 310 during the dissipating process.

Although the retrofitting method is not limited to the specific order described herein, among the last items to be installed on the retrofitted electrically powered service rig 200 as shown in FIG. 9, are a plurality of hydraulic cylinders 136, the recertified and painted derrick base 144, and the recertified and painted derrick 140 and associated equipment. The plurality of hydraulic cylinders 136 are used to raise and lower the derrick 140 between a horizontal position and a vertical position, as shown in FIGS. 1 and 2. The plurality of hydraulic cylinders 136 may be the hydraulic cylinders 136 removed from the mechanically powered service rig 100, or they may be other hydraulic cylinders 136. Other associated equipment, such as the cabling system, the traveling block 145, and the plurality of stabilizing guy wires, are usually installed after installation of the derrick base 144 and the derrick 140. However, the order of installation may be altered and performed in any suitable order.

As shown in FIG. 9, the derrick base 144 is mounted and fastened to the rear end 113 of the retrofitted electrically powered service rig 200 using a suitable fastening method. The derrick 140 is lowered into a position that aligns the pivoting connection 143 of the derrick base 144 with the pivoting connection 143 of the derrick 140. The pins are installed into the pivoting connection 143, thereby enabling pivoting of the derrick 140 between the horizontal position and the vertical position, as shown in FIGS. 1 and 2.

The hydraulic cylinders 136 used to raise and lower the derrick may be connected to the derrick 140 at a plurality of connection areas. The hydraulic lines that supply pressurized hydraulic fluid from the HPU system 260 are connected to the hydraulic cylinders 136 to supply power for raising and lowering of the derrick 140.

In some embodiments, the traveling block 145, the cabling system, and the plurality of stabilizing guy wires are installed onto the retrofitted electrically powered service rig 200. The cabling system includes a cable that is routed between a cylindrical surface of the drum of the electrically powered drawworks 227, through a plurality of sheaves in the crown block 141, and to the traveling block 145. The cable is also wrapped around the cylindrical surface of the drum for winding and unwinding during rig service operations. The cabling system further includes a plurality of hoisting cables routed between the drums of the hydraulically powered winches 135 and a plurality of pulleys located at the derrick crown 141, and the hoisting cables are installed onto the retrofitted electrically powered service rig 200. Further, the plurality of stabilizing guide wires are usually installed by attaching one end of the guide wires to the top of the derrick and the other end to the chassis 104 or to a plurality of arms that may be extended out from the retrofitted service rig 200.

It is contemplated the operational sequence of the retrofitting methods is not limited to the order in which they are described, but may be performed in any suitable order described herein.

Embodiments of the present disclosure includes a control system for a service rig, such as service rig 200. In some aspects, the present disclosure relates to the upgrade of a service rig to facilitate electronic control of one or more equipment of the service rig.

Figure 11:
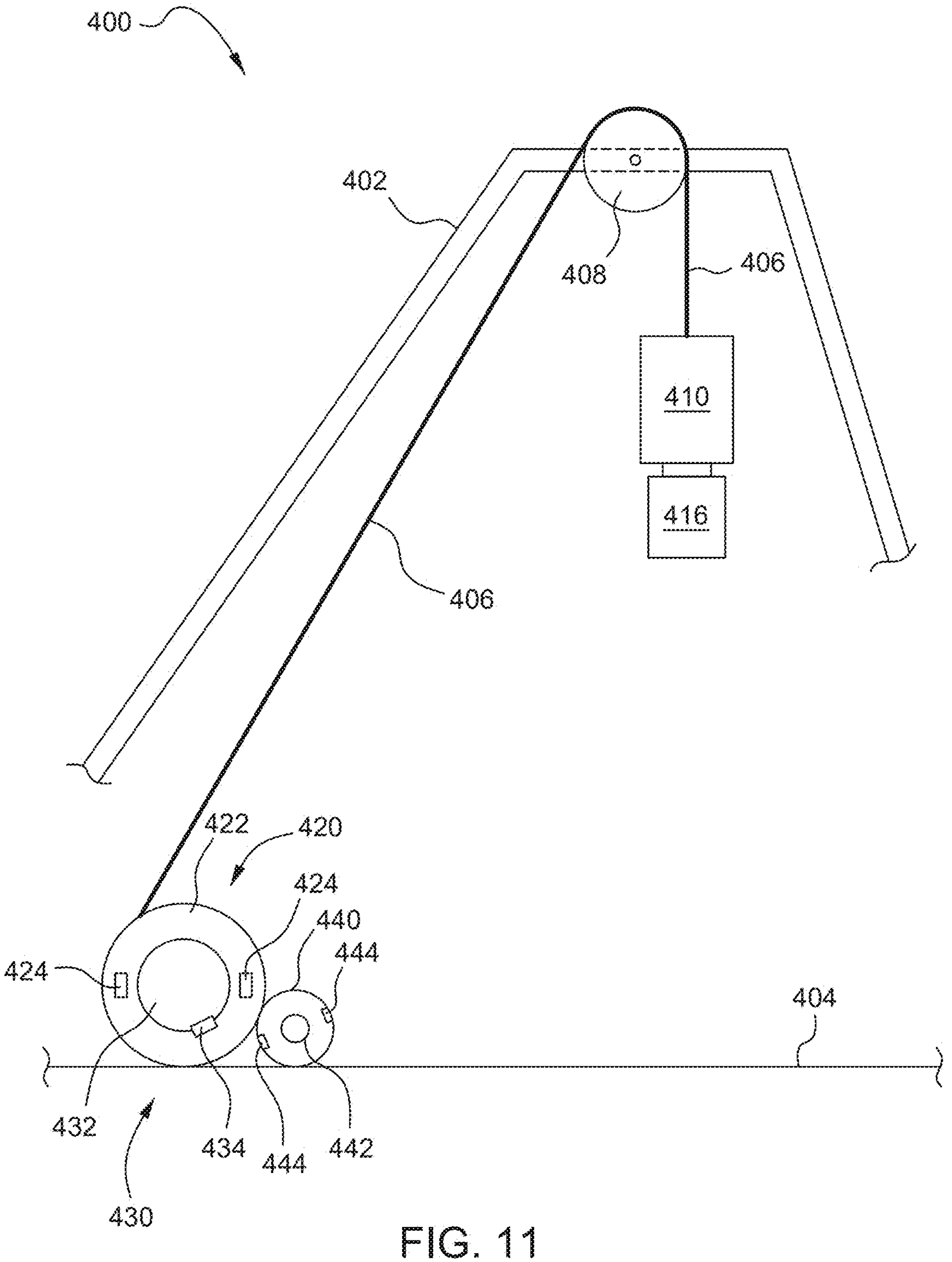
FIG. 11 schematically illustrates a portion of a rig showing a derrick and drawworks, according to some embodiments.

FIG. 11 schematically illustrates a portion of a rig 400. In some embodiments, the rig 400 is a drilling rig. In some embodiments, the rig 400 is a service rig. The rig 400 includes a derrick 402 that extends above a floor 404. A crown block 408 is located at an upper end of the derrick 402. A drawworks 420 is located at the floor 404. In some examples, the drawworks 420 is located on the service rig 200. A traveling block 410 is suspended below the crown block 408 by a cable 406 that extends from the drawworks 420 and around the crown block 408. The traveling block 410 is raised by using the drawworks 420 to retract the cable 406 and is lowered by using the drawworks 420 to pay out the cable 406. In some embodiments, a tubular handling tool 416, such as a top drive, power swivel, or elevator, is suspended from the traveling block 410. In some embodiments, the tubular handling tool 416 is omitted.

The drawworks 420 includes a drum 422, onto which the cable 406 is wound. Rotation of the drum 422 in one direction retracts the cable 406, and rotation of the drum 422 in an opposite direction pays out the cable 406. One or more sensors 424 (two are shown) are coupled to the drum 422. In some examples, the one or more sensors 424 detect the number of rotations of the drum 422, including full rotations and partial rotations. In some examples, the one or more sensors 424 detect an angular position of the drum 422 relative to a datum. In some embodiments, the one or more sensors 424 move with the drum 422 as the drum 422 rotates. In some embodiments, the one or more sensors 424 remain in a fixed position, and the drum 422 rotates relative to the one or more sensors 424.

The drawworks 420 includes a brake 430 coupled to the drum 422. In some embodiments, the brake 430 includes one or more discs 432 and one or more brake shoes 434. The one or more brake shoes 434 bear against the one or more discs 432 to provide a friction braking force to the drum 422. In some embodiments, the one or more brake shoes 434 are biased into contact with the one or more discs 432, such by a spring. The braking force applied to the drum 422 is regulated by applying a release force to the one or more brake shoes 434 that opposes the bias force applied to the one or more brake shoes 434. In an example, the release force is applied by a piston, such as a hydraulic piston.

The drum 422 is driven by a motor 440. In some embodiments, the motor 440 is an electric motor. In some examples the motor 440 is operatively connected to the drawworks 420 by a gearbox system to control the rotational ratio of the motor 440 relative to the drum 422. In some examples, the motor 440 is an alternating current (AC) motor. In some examples, the motor 440 is a direct current (DC) motor. In some embodiments, the motor 440 includes one or more sensors 444 (two are shown). In some examples, the one or more sensors 444 detect the number of rotations of an armature 442 of the motor 440, including full rotations and partial rotations. In some examples, the one or more sensors 444 detect an angular position of the armature 442 relative to a datum. In some embodiments, the one or more sensors 444 move with the armature 442 as the armature 442 rotates. In some embodiments, the one or more sensors 444 remain in a fixed position, and the armature 442 rotates relative to the one or more sensors 444.

The motor 440 is operated to rotate the drum 422 to retract or pay out the cable 406. In some embodiments, the vertical position of the traveling block 410 is deduced from the rotational travel of the drum 422. In some examples, data from the one or more sensors 424 is used to calculate a length of the cable 406 that has been retracted or payed out by rotation of the drum 422. The length of the cable 406 that has been retracted or payed out by rotation of the drum 422 is related to the change in vertical position of the traveling block 410. In some embodiments, the vertical position of the traveling block 410 is deduced from the rotational travel of the armature 442 of the motor 440. In some examples, data from the one or more sensors 444 is used to calculate a length of the cable 406 that has been retracted or payed out by rotation of the drum 422. Through gearing between the armature 442 and the drum 422, the rotational travel of the armature 442 is related to the rotational travel of the drum 422.

In some embodiments, the rig 400 includes other equipment, such as tongs, winches, mud pumps, and the like.

Figure 12:
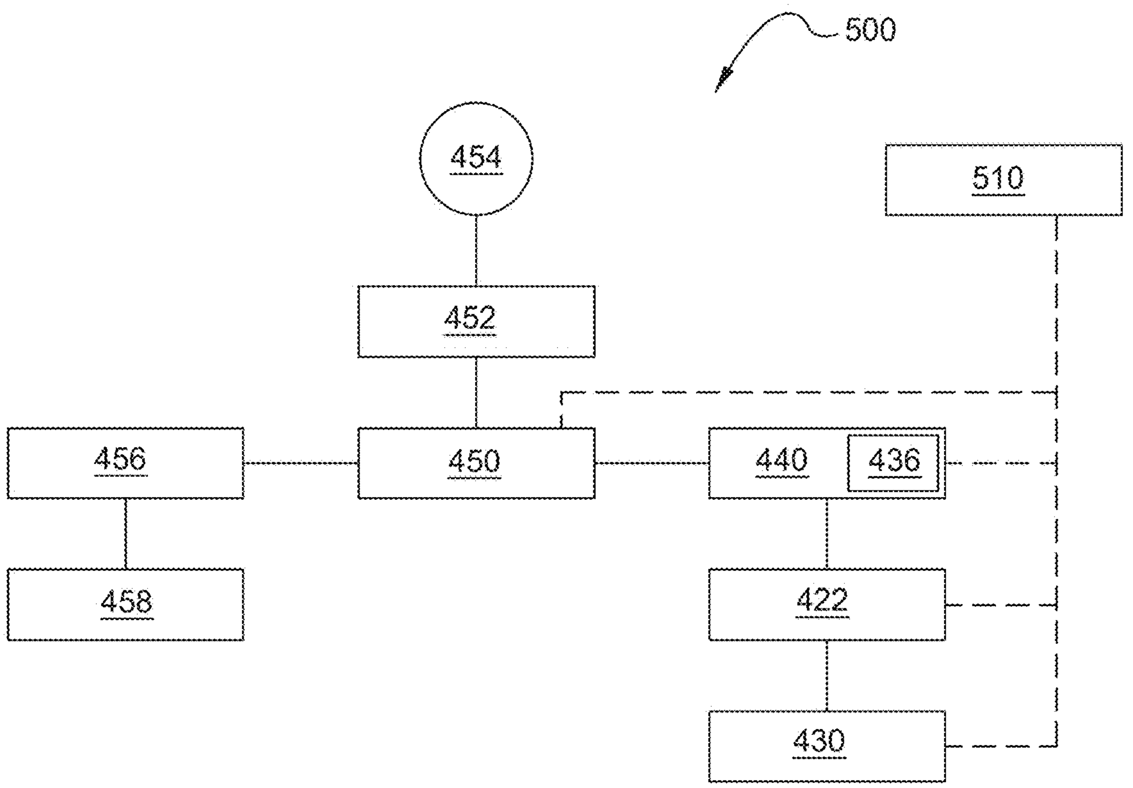
FIG. 12 schematically illustrates a control system of the rig of FIG. 11, according to some embodiments.

FIG. 12 schematically illustrates a control system 500 of the rig 400 (e.g., service rig 200) integrated with the drawworks 420 and with other equipment of the rig 400. In the illustrated example, the motor 440 is an AC motor. The motor 440 is powered by a variable frequency drive (VFD) 450. In some embodiments, the VFD 450 receives electricity from an electrical grid 454. In some examples, the VFD 450 is connected to the grid 454 via a transformer 452. In some embodiments, the VFD 450 receives electricity from a generator 456. The generator 456 is driven by an engine 458. In some examples, the engine 458 is powered by one or more of diesel, biofuel (such as biodiesel), or gas (such as gas produced on location or obtained from a gas line). In some examples, the engine 458 is the first engine 102 or the second engine 103. In some embodiments, the VFD 450 is coupled to the grid 454, and the generator 456 and engine 458 are used to provide a backup power supply to the VFD 450.

The control system 500 includes a controller 510. The controller 510 includes a central processing unit (CPU), a memory containing instructions, and support circuits for the CPU. The memory, or non-transitory computer readable medium, is one or more of a readily available memory such as random access memory (RAM), read only memory (ROM), floppy disk, hard disk, flash drive, or any other form of digital storage, local or remote. The support circuits are coupled to the CPU for supporting the CPU. The support circuits include cache, power supplies, clock circuits, input/output circuitry and subsystems, and the like. Operations and operating parameters are stored in the memory as a software routine that is executed or invoked to configure the controller 510 into a specific purpose controller to control the operations of the rig 400. The controller 510 is configured to conduct one or more of the operations described herein. The instructions stored on the memory, when executed, cause one or more of the operations described herein to be conducted.

The controller 510 is coupled to the VFD 450, and controls the operation of the VFD 450. The controller 510 is coupled to the drawworks 420, and controls operation of the drawworks 420. In some examples, the controller 510 is coupled to the motor 440, such as to the one or more sensors 444. In some examples, the motor 440 is coupled to the brake 430. In some examples, the motor 440 acts as an electric brake 436 for slowing or stopping the drum 422 by controlling the amount of power supplied to the motor 440. The amount of power supplied can be controlled by the controller 510. In some examples, the motor 440 is coupled to the drum 422, such as to the one or more sensors 424. In some embodiments, the controller 510 is coupled to the generator 456, and controls operation of the generator 456. In some embodiments, the controller 510 is coupled to the engine 458, and controls operation of the engine 458.

In some embodiments, the control system 500 monitors and/or controls other operational parameters, such as weight on string, pump rate, pump pressure, tong operating parameters (such as pressure, force, etc.), the status of slips (or a spider) at the floor 404 (e.g. open or closed), or the like.

Figure 13:
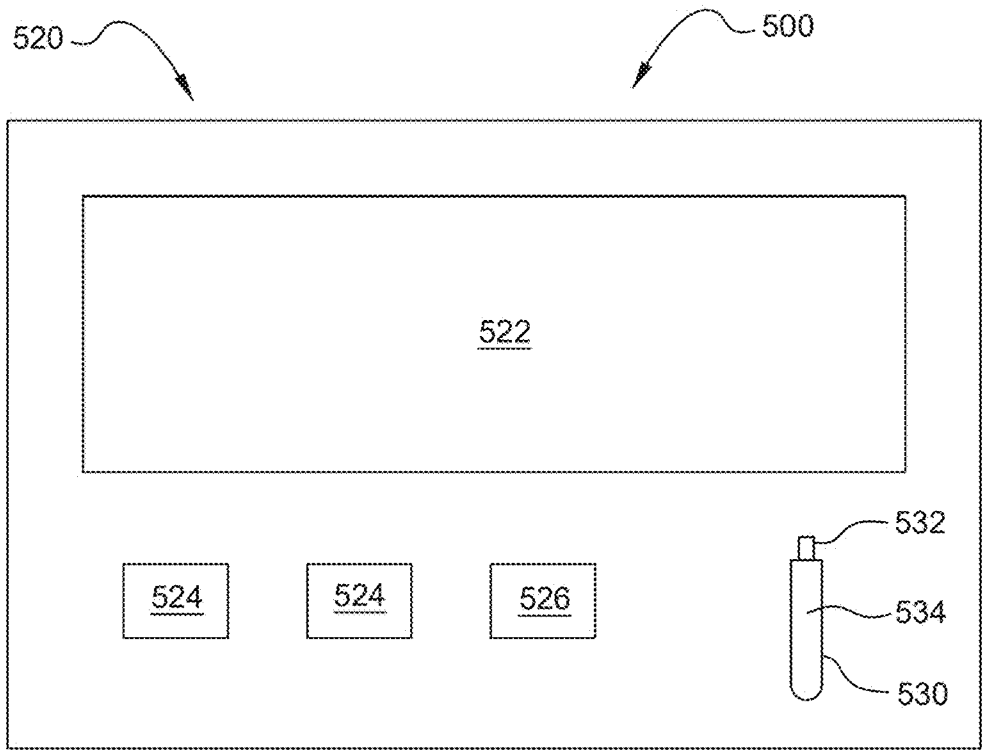
FIG. 13 schematically illustrates an exemplary user interface of the control system of FIG. 12, according to some embodiments.

FIG. 13 schematically illustrates an exemplary user interface 520 of the control system 500. In some embodiments, the user interface 520 is the control center 270 described above in FIG. 8. The user interface 520 is coupled to the controller 510. The user interface 520 includes a display 522. The display 522 presents a user with operational data, such as the vertical position of the traveling block 410. In some embodiments, the display 522 serves to facilitate user inputs, such as boundary values for one or more operational parameters, such as a maximum speed of travel of the traveling block 410. In some examples, the display 522 includes a touch screen.

In some embodiments, the user interface 520 includes one or more control switches 524, such as a button, toggle switch, dial, or the like. In some examples, a control switch 524 facilitates the activation or deactivation of a lock on the brake 430. For instance, when actuated, the lock may prevent disengagement of the brake shoes 434 from the one or more discs 432, and deactivation of the lock permits disengagement of the brake shoes 434 from the one or more discs 432. In some examples, a control switch 524 facilitates the activation of an override. For instance, when the override is deactivated, movement of the traveling block 410 beyond a preset position is prevented, and when the override is activated, movement of the traveling block 410 beyond the preset position is permitted.

In some embodiments, the user interface 520 includes one or more warning lights 526. In some examples, a warning light 526 is activated when the override is activated, or when the traveling block 410 is moved beyond a preset position. In some examples, a warning light 526 is integrated into a control switch 524.

In some embodiments, the user interface 520 includes one or more joysticks 530. In some examples, a joystick 530 facilitates operation of a winch. In some examples, a joystick 530 facilitates operation of the drawworks 420. For instance, the joystick 530 may be moved in one direction to cause rotation of the drum 422 to retract the cable 406 and raise the traveling block 410, and the joystick 530 may be moved in an opposite direction to cause rotation of the drum 422 to pay out the cable 406 and lower the traveling block 410. The joystick 530 facilitates operation of the motor 440 as the electric brake 436 to slow or stop the drum 422.

In some embodiments, the joystick 530 includes a safety button 532, such as a dead man button. The safety button 532 is depressed by an operator in order to facilitate operation of the drawworks 420. In an example, if the operator releases the safety button 532, the control system 500 stops the motor 440 using the electric brake 436, and/or may apply the brake 430. The drum 422 stops, and the traveling block 410 ceases movement up or down. In some embodiments, the safety button 532 is located at an upper end of the joystick 530, and may be depressed using a thumb of the operator. In some embodiments, the safety button 532 is incorporated into a hand grip 534 of the joystick 530. In some embodiments, the safety button 532 includes a first safety button 532 located at an upper end of the joystick 530 and a second safety button 532 incorporated into a hand grip 534 of the joystick 530.

Figure 14:
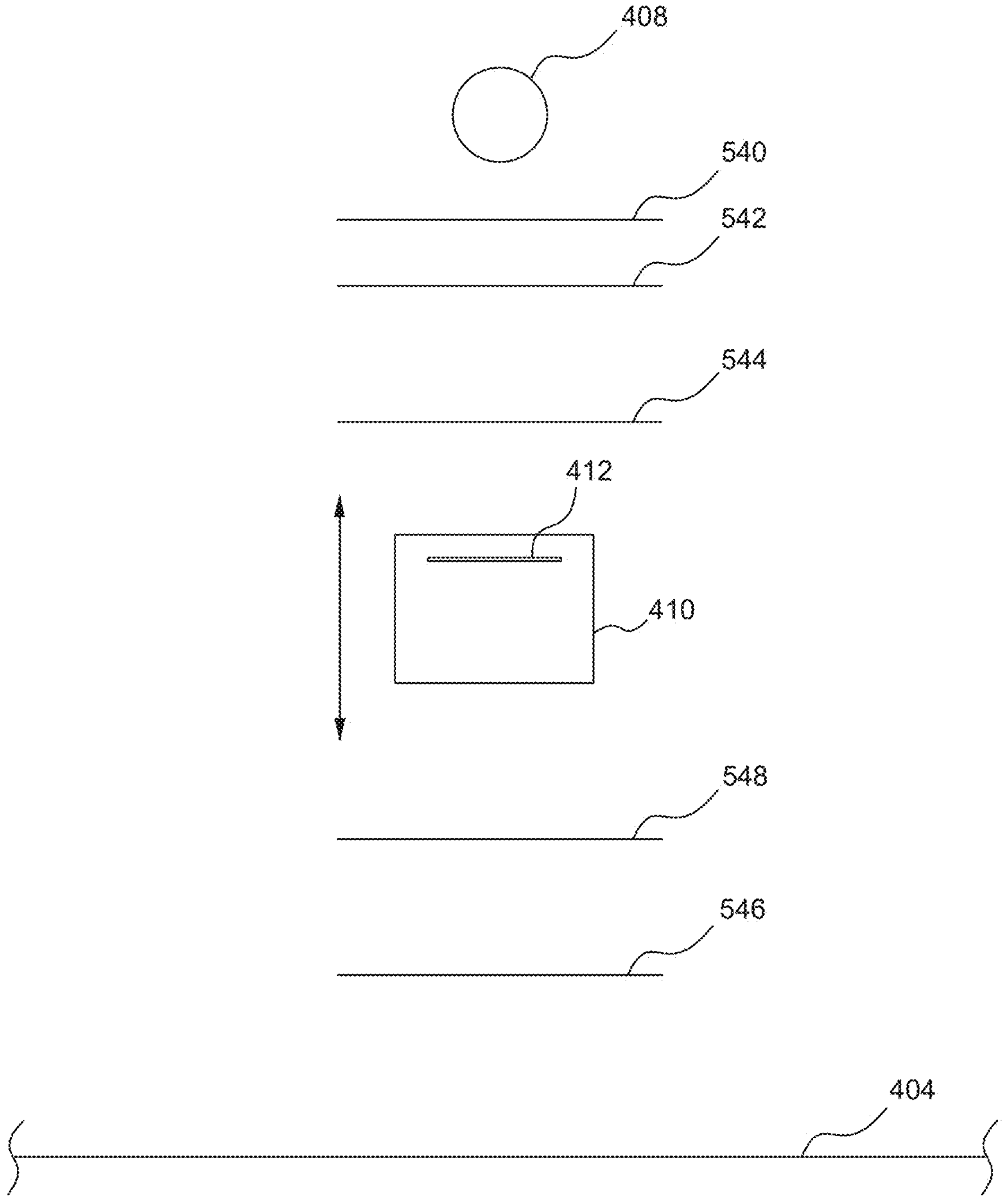
FIG. 14 schematically illustrates exemplary aspects of the control of an equipment of the rig of FIG. 11, according to some embodiments.

FIG. 14 schematically illustrates exemplary aspects of the control of the drawworks 420. The crown block 408 is depicted above the floor 404 of the rig 400, and the traveling block 410 is between the crown block 408 and the floor 404. In some embodiments, the control system 500 uses a datum 412 of the traveling block 410 as an indication of the vertical position of the traveling block 410 between the crown block 408 and the floor 404. In some examples, the datum 412 is at an upper end of the traveling block 410. In some examples, the datum 412 is at a lower end of the traveling block 410. In some examples, the datum 412 is between the upper end and the lower end of the traveling block 410. In some examples, the control system 500 uses a first datum 412 at the upper end of the traveling block 410 to control upward movement of the traveling block 410, and uses a second datum 412 at the lower end of the traveling block 410 to control downward movement of the traveling block 410.

The control system 500 includes one or more threshold positions that represent vertical positions between the crown block 408 and the floor 404. The control system 500 determines the vertical location of the datum 412 (such as described above) with respect to the one or more threshold positions.

A first threshold position 540 represents a maximum extent of vertical travel of the traveling block 410. In an example, the first threshold position 540 corresponds to a vertical position of the traveling block 410, above which the traveling block 410 is closer to the crown block 408 than an appropriate safety distance.

A second threshold position 542 below the first threshold position 540 represents a maximum extent of vertical travel of the traveling block 410 during a specific operation. In an example, the second threshold position 542 corresponds to a vertical position of the traveling block 410 at which a tubular handling tool 416 suspended below the traveling block 410 is positioned for performing a tubular handling operation (such as holding or releasing an upper end of a tubular) in the derrick 402.

A third threshold position 544 below the second threshold position 542 represents a location at which an upward speed of travel of the traveling block 410 is slowed. In an example, when the datum 412 moves from below the third threshold position to above the third threshold position 544, the control system 500 commences ramping down the speed of rotation of the drum 422 and then stops rotation of the drum 422 when the datum 412 reaches the second threshold position 542.

A fourth threshold position 546 below the third threshold position 544 represents a lowest extent of vertical travel of the traveling block 410 during a specific operation. In an example, the fourth threshold position 546 corresponds to a vertical position of the traveling block 410 at which a tubular handling tool 416 suspended below the traveling block 410 is positioned for performing a tubular handling operation (such as holding or releasing an upper end of a tubular) at the floor 404.

A fifth threshold position 548 between the third threshold position 544 and the fourth threshold position 546 represents a location at which downward speed of travel of the traveling block 410 is slowed. In an example, when the datum 412 moves from above the fifth threshold position to below the fifth threshold position 548, the control system 500 commences ramping down the speed of rotation of the drum 422 and then stops rotation of the drum 422 when the datum 412 reaches the fourth threshold position 546.

In some embodiments, the control system 500 is configured such that the operator applies an override in order to move the traveling block 410 above the second threshold position 542. In an example, the operator activates the override by activating a corresponding control switch 524. In some embodiments, the control system 500 adjusts a maximum upward travel speed of the traveling block 410 to be less than a nominal maximum travel speed when the traveling block 410 is between the first threshold position 540 and the second threshold position 542. In an example, the maximum upward travel speed of the traveling block 410 may be 15% or less, 10% or less, or 5% or less than a nominal maximum travel speed when the traveling block 410 is between the first threshold position 540 and the second threshold position 542.

In some embodiments, the ramping down of the speed of rotation of the drum 422 is performed such that the speed of travel of the traveling block 410 decreases at a constant deceleration with respect to the vertical position of the datum 412 of the traveling block 410. In an example, the control system 500 sets the speed of travel of the traveling block 410 to be proportional to the remaining distance between the datum 412 of the traveling block 410 and the corresponding threshold position (e.g. the second threshold position 542 or the fourth threshold position 546).

In some embodiments, the control system 500 performs the ramping down of the speed of rotation of the drum 422 by adjusting the output of the VFD 450.

In some embodiments, the control system 500 performs the ramping down of the speed of rotation of the drum 422 by applying regenerative braking, such that electrical power to the motor 440 is ceased, and the motor 440 acts as a generator using the electric brake 436. In an example, the control system 500 adjusts the deceleration of the motor 440 by adjusting an electrical resistive load applied to the motor 440. In some embodiments, the electricity generated by the motor 440 is used to charge one or more batteries.

In some embodiments, the control system 500 performs the ramping down of the speed of rotation of the drum 422 by causing the brake 430 to be applied apart from the electric brake 436.

In some embodiments, the control system 500 performs the ramping down of the speed of rotation of the drum 422 by performing a combination of two or more of the above methods.

In some embodiments, an operator establishes a preset maximum speed of travel of the traveling block 410. In an example, a preset maximum speed of travel of the traveling block 410 in an upward direction is the same as a preset maximum speed of travel of the traveling block 410 in a downward direction. In another example, a preset maximum speed of travel of the traveling block 410 in an upward direction is different from a preset maximum speed of travel of the traveling block 410 in a downward direction.

In some embodiments, the control system 500 controls the speed of travel of the traveling block 410 such that the speed of travel of the traveling block 410 does not exceed a preset maximum speed regardless of operator input via the joystick 530 (FIG. 13). In an example, the preset maximum speed may be 50% of a nominal maximum speed. The operator manipulates the joystick 530 to move the traveling block 410 at a maximum speed, and the control system 500 applies the preset maximum speed as the maximum speed.

In some embodiments, the control system 500 operates the brake 430 as a parking brake of the drawworks 420. In an example, the control system 500 determines a magnitude of a load being borne by the cable 406 via a torque measurement at the motor 440 while the brake 430 is disengaged. For instance, the torque being applied by the motor 440 is related to the current draw of the motor 440. The control system 500 determines whether or not the traveling block 410 is moving. In the example, if the torque being applied by the motor 440 exceeds a preset value and the traveling block 410 is continuously vertically stationary for a preset time, the control system 500 activates the brake 430 to lock the drum 422 against rotation.

In some embodiments, the control system 500 actuates the brake 430 if the determined load being borne by the cable 406 reaches or exceeds a threshold value. In an example, the threshold value is determined so as to provide overpull protection for the rig 400 or for equipment (such as a tubular member) suspended below the traveling block 410.

In some embodiments, the control system 500 actuates the brake 430 when the traveling block 410 reaches the first threshold position 540. In an example, the operator uses the override to move the traveling block 410 above the second threshold position 542 towards the first threshold position 540 (as described above). When the traveling block 410 reaches the first threshold position 540, the control system 500 actuates the brake 430 even if the operator maintains the override in an "on" setting. Furthermore, the control system 500 actuates the brake 430 even if the operator attempts to prompt further upward movement of the traveling block 410, such as via an input using the joystick 530.

In some embodiments, the control system 500 stops operation of the motor 440 using the electric brake 436 when the traveling block 410 reaches the first threshold position 540. In an example, the operator uses the override to move the traveling block 410 above the second threshold position 542 towards the first threshold position 540 (as described above). When the traveling block 410 reaches the first threshold position 540, the control system 500 stops operation of the motor 440 even if the operator maintains the override in an "on" setting. Furthermore, the control system 500 stops operation of the motor 440 even if the operator attempts to prompt further upward movement of the traveling block 410, such as via an input using the joystick 530. The upward or downward movement of the traveling block 410 including the speed, slowing and stopping is performed by the motor 440, which is controlled by the control system 500.

In some embodiments, operation of the brake 430 (FIGS. 11, 12) as a parking brake is controlled at least in part by the operator. In an example, when preparing to initiate vertical movement of the traveling block 410, the operator unlocks the brake 430 which simultaneously activates the electric brake 436 via operation of a control switch 524 (FIG. 13) or the joystick 530. The operator then manipulates the joystick 530 (FIG. 13) to initiate vertical movement of the traveling block 410. When the control system 500 determines that the torque measurement at the motor 440 reaches a threshold value, the control system 500 initiates the release of the brake 430, and the motor 440 then starts operating to rotate the drum 422 and move the traveling block 410 vertically.

In some embodiments, a rig includes a drawworks drum driven by a motor. Rotation of the drum retracts or pays out a cable that is attached to a traveling block, thereby moving the traveling block. A control system controls operation of the drum by operating the motor. The control system actuates a brake to lock the drum against rotation in response to determining a load borne by the cable exceeds a threshold value for a preset length of time while the traveling block is not moving.

In some embodiments, a method of operating a rig includes determining a position of a traveling block while the traveling block moves vertically in a derrick of the rig and determining a speed of movement of the traveling block. The method also includes determining that the traveling block reaches a first threshold position. The method further includes automatically reducing the speed of movement of the traveling block while the traveling block moves from the first threshold position towards a second threshold position. Vertical movement of the traveling block is automatically stopped upon the traveling block reaching the second threshold position.

It is contemplated that any one or more elements or features of any one disclosed embodiment or example may be beneficially incorporated in any one or more other non-mutually exclusive embodiments or examples. While the foregoing is directed to embodiments of the present disclosure, other and further embodiments of the disclosure may be devised without departing from the basic scope thereof, and the scope thereof is determined by the claims that follow.

What is claimed is:

1. A method of retrofitting a service rig, comprising:

obtaining a service rig having a first plurality of powered service equipment for performing well service operations, an engine, and a transmission connected to and powering the first plurality of powered service equipment;

disconnecting the engine and the transmission from the first plurality of powered service equipment;

removing the first plurality of powered service equipment; and retrofitting the service rig with a second plurality of electrically powered equipment for performing the well service operations, wherein the second plurality of electrically powered equipment are operable while disconnected from the engine and the transmission.

2. The method of claim 1, further comprising performing one or more of rebuilding, refurbishing, testing, or certifying at least one of the first plurality of removed powered service equipment.

3. The method of claim 2, further comprising installing the at least one of the first plurality of removed powered service equipment back onto the service rig.

4. The method of claim 1, wherein removing the first plurality of powered service equipment comprises removing a diesel engine.

5. The method of claim 1, further comprising removing a derrick and reinstalling the derrick.

6. The method of claim 1, wherein removing the first plurality of powered service equipment comprises removing a mechanically powered drawworks.

7. The method of claim 6, wherein retrofitting the service rig includes installing an electrically powered drawworks and an electric motor for powering the electrically powered drawworks.

8. The method of claim 7, wherein retrofitting the service rig with the second plurality of electrically powered equipment comprises installing one or more of electronic devices, electrical motors, or electronic circuitry.

9. The method of claim 7, wherein retrofitting the service rig with the second plurality of electrically powered equipment comprises installing a cooling system, driver controls, an electric control box, or combinations thereof.

10. The method of claim 7, wherein retrofitting the service rig with the second plurality of electrically powered equipment comprises installing a hydraulic pumping unit (HPU) system for providing pressurized hydraulic fluid to hydraulic equipment on the service rig, wherein the HPU system includes an HPU pump and a second electric motor for powering the HPU pump.

11. The method of claim 7, wherein retrofitting the service rig with the second plurality of electrically powered equipment comprises installing an air compressor powered by an air compressor electric motor.

12. The method of claim 7, further comprising using the electric motor as a braking system during operation of the electrically powered drawworks.

13. The method of claim 1, wherein removing the first plurality of powered service equipment comprises removing one or more of hydraulic equipment, walkways, or hydraulic pump powered by a diesel engine.

14. The method of claim 1, further comprising providing a support system to supply electricity to the second plurality of electrically powered equipment for operating the service rig.

15. The method of claim 14, wherein the support system comprises a vehicle, trailer, or a skid; and further includes one or more of an electric generator, a variable frequency drive, or a cooling system.

16. A method of retrofitting a service rig, comprising:

obtaining a service rig having a chassis and a first drawworks for performing well service operations, an engine, and a transmission connected to and powering the first drawworks;

disconnecting the transmission from the first drawworks;

removing the first drawworks and the transmission from the chassis; and retrofitting the service rig with a second drawworks for performing well service operations and an electric motor for powering the second drawworks; and coupling a support system to the service rig to electrically support the electric motor.

17. The method of claim 16, wherein the support system comprises an electrical power source for powering the electric motor.

18. The method of claim 17, wherein the power source is an electrical generator or a connection to a utility grid.

19. The method of claim 16, wherein the support system comprises a variable frequency drive for controlling the electric motor on the service rig.

20. A method of retrofitting a service rig, comprising:

obtaining a service rig having a first well service equipment for performing a well service operation, an engine and a transmission connected to and powering the first well service equipment;

disconnecting the first well service equipment from the engine and the transmission;

removing the first well service equipment; and retrofitting the service rig with a second well service equipment for performing the well service operation and an electrical motor connected to and powering the second well service equipment, wherein the electrical motor is disconnected from the transmission.

21. The method of claim 20, wherein the second well service equipment comprises an electrically powered drawworks, and further comprising:

a hydraulic pumping unit (HPU) pump for providing pressurized hydraulic fluid to hydraulic equipment on the service rig; and a second electric motor for powering the HPU pump.

22. The method of claim 21, further comprising using the electric motor as a braking system during operation of the electrically powered drawworks.

23. The method of claim 22, further comprising:

a second hydraulic pumping unit (HPU) pump for providing pressurized hydraulic fluid to a second braking system for the electrically powered drawworks; and a third electric motor for powering the second HPU pump.

24. The method of claim 23, further comprising a joystick for operation of the electrically powered drawworks, wherein the joystick includes a safety button located on the joystick, and wherein when the safety button is unactivated, the motor powering the electrically powered drawworks is stopped.

25. The method of claim 23, wherein removing the first well service equipment comprises removing a mechanically powered drawworks, and further comprising:

removing at least one of a derrick, a derrick base, a hydraulic equipment, a stabilizing jack, or a collapsible walkway.

* * * * *